Patented Nov. 3, 1942

2,300,597

UNITED STATES PATENT OFFICE 2,300,597

DIALKYL CYANAMIDE COMPOUND

Richard O. Roblin, Jr., Stamford, Conn., assignor to American Cyanamid Company, New York, N. Y., a corporation of Maine No Drawing. Application May 23, 1939,
Serial No. 275,216

1 Claim. (Cl. 260—551)

This invention relates to new dialkyl cyanamide compounds of formula—

where R and R' represent different alkyl radicals having a total of more than six carbon atoms, R being saturated and R' being either saturated or unsaturated.

These compounds may be generally prepared in an inert solvent such as benzene or petroleum ether fractions by the reaction between the corresponding secondary amine, cyanogen chloride and caustic soda. A preferred equation for this reaction is as follows:

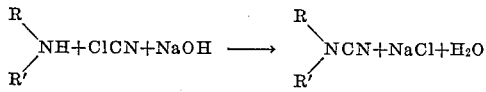

Example I 6.1 grams of cyanogen chloride are dissolved in 100 cc. of benzene. After cooling the solution to 0°–5° C., 11.5 grams of ethyl n-amyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as ethyl n-amyl cyanamide.

Example II 6.1 grams of cyanogen chloride are dissolved in 100 cc. of heptane. After cooling the solution to 0°–5° C., 11.3 grams of isobutyl allyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as isobutyl allyl cyanamide.

Example III 6.1 grams of cyanogen chloride are dissolved in 100 cc. of benzene. After cooling the solution to 0°–5° C., 12.9 grams of methyl n-heptyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as methyl n-heptyl cyanamide.

Example IV 6.1 grams of cyanogen chloride are dissolved in 100 cc. of benzene. After cooling the solution to 0°–5° C., 12.5 grams of isoamyl propargyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as isoamyl propargyl cyanamide.

Example V 6.1 grams of cyanogen chloride are dissolved in 100 cc. of heptane. After cooling the solution to 0°–5° C., 15.7 grams of ethyl n-octyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as ethyl n-octyl cyanamide.

Example VI 6.1 grams of cyanogen chloride are dissolved in 100 cc. of heptane. After cooling the solution to 0°–5° C., 25.5 grams of methyl n-cetyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as methyl n-cetyl cyanamide.

Similarly other dialkyl cyanamides of the above class in both the normal and isomeric forms may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not to be limited thereto but is to be construed broadly and restricted solely by the scope of the appended claim.

I claim:

As a new compound, ethyl n-amyl cyanamide.

RICHARD O. ROBLIN, Jr.